United States Patent Office 2,925,365
Patented Feb. 16, 1960

2,925,365

COLORING SOLID PHARMACEUTICAL FORMS AND COMPOSITIONS THEREFOR

Arnold E. Nicholson, Philadelphia, and Stanley J. Tucker, Elkins Park, Pa., assignors to Smith Kline & French Laboratories, Philadelphia, Pa., a corporation of Pennsylvania No Drawing. Application November 27, 1957
Serial No. 699,207

10 Claims. (Cl. 167—82)

This invention relates to a novel composition and method useful for coloring solid pharmaceutical forms such as preformed tablets, pills, pellets and the like.

The traditional pan coating methods for coloring solid pharmaceutical forms in the pharmaceutical industry have remained unchanged for years despite being time-consuming operations which are difficult to carry out and reproduce. The disadvantages of the methods of prior art are the large number of coats necessary, from about 40 to 60, the difficult reproducibility of color from batch to batch, the limitation to nontoxic dyes of the soluble variety and the relatively poor stability upon aging.

The composition and method of this invention significantly reduces the disadvantages of the prior art. Only from about 10 to about 25 coloring coats are necessary. The color is stable and absolutely reproducible from batch to batch. The number of nontoxic stable colorants or pigments available for use by the operator is much greater and only one concentration of pigment is used in the coating process. The advance over the prior art by the composition and method of this invention is noteworthy in that it reduces what was heretofore considered an art passed down from operator to operator to a reproducible operation.

Furthermore, utilization of this composition and method reduces operating time greatly. For instance, when using the water soluble dyes of the prior art, up to 25 smoothing coats had to be applied to rough tablets prior to the color coating since the soluble dyes tend to collect in surface irregularities thereby resulting in an uneven color. Using the composition and method of this invention, the number of smoothing coats is reduced and often eliminated entirely. Also, the drying time between coating applications is greatly reduced.

The coloring composition of this invention is comprised of a substantially water-insoluble, nontoxic coloring agent such as preferably an insoluble dye or an insoluble lake, a substantially water-insoluble, nontoxic opaque material such as calcium carbonate, barium sulfate or preferably titanium dioxide, an adhesive aqueous suspending medium such as a gelatin solution or preferably a syrup solution, and a nontoxic surfactant such as a nontoxic cationic, nontoxic nonionic or preferably nontoxic anionic surface active agent to maintain the coloring agent and opaque material in suspension.

The insoluble nontoxic coloring agent will be in an amount to provide the desired color and shade preferably from about 0.00006% to about 10% by weight of the coloring composition. The nontoxic opaque constitutent, when employed, will amount to from about .33% to about 30% by weight of the coloring composition. The surfactant will be in very small amounts such as from about 0.0000006% to about 1% by weight of the coloring composition.

The aqueous suspending medium will make the composition up to the desired volume. The suspending medium is preferably a syrup solution, for example, an aqueous sugar solution such as an aqueous solution of maltose, lactose, glucose or sucrose. Alternatively, minor amounts of gelatin, cellulose derivatives or pectin may be added. The composition of the suspending medium may vary widely depending on the physical characteristics of the other constituents of the coloring suspension. Exemplary of the preferred syrup or sugar solutions is Simple Syrup, U.S.P. which is an 85% sucrose solution. Other sugar derivatives such as sorbitol can be substitute for the sugar to form an aqueous syrup solution. The suspending media may be further diluted with water if desired.

Exemplary of the surfactant constituent are sodium 2-ethylhexane sulfonate, sodium di[2-ethylh xyl]-phosphate, sodium salt of sulfate ester of an alkyl phenoxy polyoxyethylene ethanol, oleic acid ester of sodium isethionate, sodium N-methyl-N-acyl taurate, butyl oleate sulfonate, modified alkyl aryl polyether alcohol, sodium salt of sulfonated lauryl and myristyl collamide, sodium salt of sulfated lauryl and myristyl collamide, and sodium alkyl aryl sulfonate. The preferred surfactant is dioctyl sodium sulfosuccinate.

The insoluble dyes and lakes used in the composition of this invention are those certified for drug use such as the D & C coloring materials. Exemplary of the preferred insoluble colors (dyes) are those coal tar colors (dyes) listed under their Food and Drug Administration designations are D & C Blue #6, D & C Blue #9, D & C Green #6, D & C Violet #2, D & C Red #17, D & C Red #18, D & C Orange #5, D & C Yellow #7, D & C Yellow #11, D & C Red #6, D & C Red #7, D & C Red #35, D & C Orange #15, D & C Yellow #6, D & C Green #1, D & C Blue #1 and D & C Violet #7. Further exemplary are the substantially water-insoluble FD & C and D & C colors (dyes) listed in The Merck Index, sixth edition.

The method of coloring solid pharmaceutical forms such as preformed tablets, pills, pellets and the like in accordance with this invention comprises first forming a coloring composition by suspending the substantially water-insoluble, nontoxic coloring agent and the substantially water-insolube, nontoxic opaque material in the adhesive aqueous suspending medium employing the nontoxic surface active agent to effect the suspending of the coloring agent in the aqueous medium. The compounds employed in carrying out the method are fully set forth above together with the amounts in which they must be employed. The suspending can be carried out in any suitable mixing apparatus capable of thoroughly dispersing ingredients, for example, a homogenizing mixer or a high speed blender. The order of mixing can be varied as desired.

It has been found advantageous to prepare in advance a stock suspension of the coloring composition. The stock suspension is then stirred well and preferably further diluted prior to application to the tablets or other forms. The stock suspension will preferably contain from about 0.001% to about 10% by weight of the nontoxic coloring agent, from about 5% to about 30% by weight of the nontoxic opaque constituent, and from about 0.00001% to about 1% by weight of the nontoxic surface active agent in the aqueous suspending medium. This stock suspension is preferably diluted prior to use such as diluting 100 grams of stock suspension to 650 g. with a standard coating syrup.

The pharmaceutical forms to be colored, by way of specific illustration, tablets, are placed in a coating pan and rotated. The coloring composition is then added in an amount to cover the pharmaceutical forms. The thus covered forms are then dried, preferably by an air jet. These steps are repeated until the desired number of coats have been applied to achieve the desired coloring.

The following examples specifically illustrate the coloring composition of and will make obvious to one skilled in the art the full practice of the method of this invention.

*Example I*

| | Gm. |
|---|---|
| D & C Red #2 Lake | 1.2460 |
| D & C Red #5 Lake | 30.0000 |
| Titanium dioxide, N.F. | 142.5000 |
| Sodium di[2-ethylhexyl]phosphate 0.2% w./w. aqueous solution | 25.0000 |
| Purified water, U.S.P. | 75.0000 |
| An aqueous solution of—acacia (10%), gelatin (5%), liquid glucose (10%) | 320.0000 |

The glucose and titanium dioxide are mixed at top speed in a mixer for 15 minutes. The lakes and sodium di[2-ethylhexyl]phosphate are added to the water and mixed in a blender for 15 minutes. The aqueous suspension is added to the glucose mixture and mixed at top speed in the mixer for 15 minutes.

The standard suspension (100.0 g.) is diluted to 650 g. with an aqueous solution of acacia (10%), gelatin (5%) and liquid glucose (10%).

The diluted suspension is added to a regular commercial run of sealed and rounded isopropamide iodide tablets each containing 5.0 mg. of pure isopropamide while the tablets are rotated in a coating pan. The addition is continued until the tablets are evenly and completely covered. An air jet is turned on to dry the tablets thoroughly. This procedure is repeated for 25 coats. After the last application, the tablets are allowed to dry without an air stream while rotating (2 hours).

*Example II*

| | | |
|---|---|---|
| D & C Yellow #11 | gm. | 5.0 |
| D & C Blue #9 | gm. | 1.0 |
| Titanium dioxide, N.F. | gm. | 50.0 |
| Purified water, U.S.P. | ml. | 75.0 |
| Simple syrup, U.S.P. | ml. | 250.0 |
| Dioctyl sodium sulfosuccinate (100%) | gm. | 0.005 |

The ingredients are weighed and mixed following the procedure of Example I. The stock suspension (200.0 g.) is diluted to 650 g. with syrup.

Sufficient color coating suspension to cover is added to sealed tablets containing 224.0 mg. of methyl-promazine per tablet rotating in a coating pan. After jet air drying, the process is repeated for 20 coats. The tablets are finally dried without an air stream with rotating. The tablets are pan dried overnight.

*Example III*

| | | |
|---|---|---|
| D & C Blue #6 | gm. | 5.0 |
| Titanium dioxide, N.F. | gm. | 100.0 |
| Simple syrup, U.S.P. | ml. | 500.0 |
| Purified water, U.S.P. | ml. | 250.0 |
| Dioctyl sodium sulfosuccinate (100%) | gm. | 0.1 |

The ingredients are mixed, the dioctyl sodium sulfosuccinate being employed to provide for the suspending of the D & C Blue #6 in the aqueous medium. The pigment suspension is diluted and applied to tablets containing 5.90 mg. of trifluoperazine dihydrochloride per tablet in 25 coats as described in Example I.

*Example IV*

| | | |
|---|---|---|
| Titanium dioxide, N.F. | gm. | 100.0 |
| Simple syrup, U.S.P. | ml. | 500.0 |
| Carbon Black | gm. | 5.0 |
| Water, U.S.P. | ml. | 250.0 |
| Dioctyl sodium sulfosuccinate (100%) | gm. | 0.002 |

The ingredients are mixed, the dioctyl sodium sulfosuccinate being employed to provide for the suspending of the Carbon Black in the aqueous medium. The stock suspension (800.0 gm.) is diluted to 2,000 ml. with syrup solution. The pigment suspension is added to a run of isopropamide iodide sustained release pellets (sufficient for 145,000 capsules) with rotating and mixing in coating pans. The pellets are dried overnight and screened.

*Example V*

| | Gm. |
|---|---|
| D & C Red #2 Lake | 1.2460 |
| D & C Red #5 Lake | 30.0000 |
| Titanium dioxide, N.F. | 142.5000 |
| Dioctyl sodium sulfosuccinate 0.1% w./w. solution | 50.0000 |
| Purified water, U.S.P. | 75.0000 |
| Simple syrup, U.S.P. | 320.0000 |

The syrup and titanium dioxide are mixed at top speed in an Eppenbach Homomixer for 15 minutes. The pigments and surfactant are added to the water and mixed in a Waring Blendor for 15 minutes. The aqueous suspension is added to the syrup mixture and mixed at top speed in the Homomixer for 15 minutes.

The standard suspension (100.0 g.) is diluted to 650.0 gm. with simple syrup.

The diluted suspension is added to a regular commercial run of sealed and rounded isopropamide iodide tablets each containing 5.0 mg. of pure isopropamide while the tablets are rotated in a coating pan. The addition is continued until the tablets are evenly and completely covered. The air jet is turned on to dry the tablets thoroughly. This procedure is repeated for 30 coats. After the last application, the tablets are allowed to dry without access to air while rotating (2 hours).

What is claimed is:

1. A composition for coloring pharmaceutical tablets comprising a substantially water-insoluble, nontoxic coloring agent, a substantially water-insoluble, nontoxic opaque material selected from the group consisting of titanium dioxide, calcium carbonate and barium sulfate, an adhesive aqueous suspending medium and a nontoxic surface active agent to maintain the coloring agent in suspension in said suspending medium.

2. A composition for coloring pharmaceutical tablets in accordance with claim 1 in which the suspending medium is a syrup solution.

3. A composition for coloring pharmaceutical tablets in accordance with claim 1 in which the surface active agent is dioctyl sodium sulfosuccinate.

4. A composition for coloring pharmaceutical tablets in accordance with claim 1 in which the suspending medium is an aqueous solution of sucrose and the surface active agent is dioctyl sodium sulfosuccinate, the coloring agent being present in an amount from about 0.00006% to about 10% by weight of the composition and the dioctyl sodium sulfosuccinate being present in an amount from about 0.0000006% to about 1% by weight of the composition.

5. A composition for coloring pharmaceutical tablets comprising a substantially water-insoluble, nontoxic coloring agent, from about .33% to about 30% by weight of the composition of titanium dioxide and from about 0.0000006% to about 1% by weight of the composition of dioctyl sodium sulfosuccinate and an aqueous solution of sucrose.

6. The method of coloring solid pharmaceutical forms which comprises forming a coloring composition by suspending a substantially water-insoluble, nontoxic coloring agent and a substantially water-insoluble, nontoxic opaque material selected from the group consisting of titanium dioxide, calcium carbonate and barium sulfate in an adhesive aqueous suspending medium, employing a nontoxic surface active agent to provide for said suspending of the coloring agent, rotating the pharmaceutical forms to be coated in a coating pan and repeatedly performing the steps of adding portions of the coloring composition to color the pharmaceutical forms and drying the pharmaceutical forms.

7. A method in accordance with claim 6 in which the suspending medium is a syrup solution.

8. A method in accordance with claim 6 in which the suspending medium is an aqueous solution of sucrose.

9. A method in accordance with claim 6 in which the surface active agent is dioctyl sodium sulfosuccinate.

10. A method in accordance with claim 6 in which the suspending medium is an aqueous solution of sucrose and the surface active agent is dioctyl sodium sulfosuccinate.

References Cited in the file of this patent

UNITED STATES PATENTS

| | | |
|---|---|---|
| 2,693,436 | Spradling | Nov. 2, 1954 |
| 2,693,437 | Spradling | Nov. 2, 1954 |

FOREIGN PATENTS

| | | |
|---|---|---|
| 762,229 | Great Britain | Nov. 28, 1956 |

OTHER REFERENCES

McBain: "Solubilization of Water Insoluble Dye in Aqueous Solutions of Commercial Detergents," Ind. and Eng. Chem., vol. 34, No. 8, August 1942, pp. 915–919.

Rowell: "The Art of Coating Tablets," part II, D. and Cos. Ind., vol. 63, No. 4, October 1948, pp. 458–460, 549–551.

Clarkson: "Tablet Coating," D. and Cos. Ind., New York, N.Y., 1951, pp. 38–47.

Merck Index, 6th ed., Merck and Co., Rahway, N.J., 1952, pp. 1112–1115.